(12) United States Patent
Dai et al.

(10) Patent No.: US 12,373,590 B2
(45) Date of Patent: Jul. 29, 2025

(54) BLOCKCHAIN-BASED SYSTEM AND METHOD FOR PREVENTING UNAUTHORIZED DELETION OF SURVEILLANCE VIDEO

(71) Applicant: Huazhong University of Science and Technology, Wuhan (CN)

(72) Inventors: Weiqi Dai, Wuhan (CN); Ziyi Liang, Wuhan (CN); Kexuan Zhao, Wuhan (CN); Deqing Zou, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 195 days.

(21) Appl. No.: 18/356,004

(22) Filed: Jul. 20, 2023

(65) Prior Publication Data
US 2024/0220647 A1 Jul. 4, 2024

(30) Foreign Application Priority Data
Dec. 30, 2022 (CN) .......................... 202211742953.6

(51) Int. Cl.
G06F 21/62 (2013.01)
H04N 5/76 (2006.01)
(52) U.S. Cl.
CPC ........... *G06F 21/6218* (2013.01); *H04N 5/76* (2013.01)

(58) Field of Classification Search
CPC ....... G06F 21/6218; G06F 21/64; H04N 5/76; H04N 5/91; Y02D 10/00; H04L 67/1097
See application file for complete search history.

(56) References Cited

FOREIGN PATENT DOCUMENTS

CN 111460526 A 7/2020

*Primary Examiner* — Brian F Shaw
(74) *Attorney, Agent, or Firm* — Smart & Biggar LP

(57) ABSTRACT

The present invention relates to a blockchain-based system and method for preventing unauthorized deletion of surveillance video, the system at least comprising: a plurality of camera components, for generating surveillance video; at least one video-recording node, for connecting to a blockchain network and randomly generating a key pair, splitting the video file received from the camera components into a plurality of video-file blocks and randomly sending them to participation nodes across the blockchain network for storage, and recording hash values of the stored video files and node information; and a blockchain network device, for updating the hash values of the video files uploaded by the video-recording nodes based on a smart contract. In the present invention, uploading and storing time for camera-videos is recorded by the smart contract as tamper-resistant time reference for law enforcement, protecting video data from malicious deletion at video-recording nodes without the need of redundant space.

20 Claims, 1 Drawing Sheet

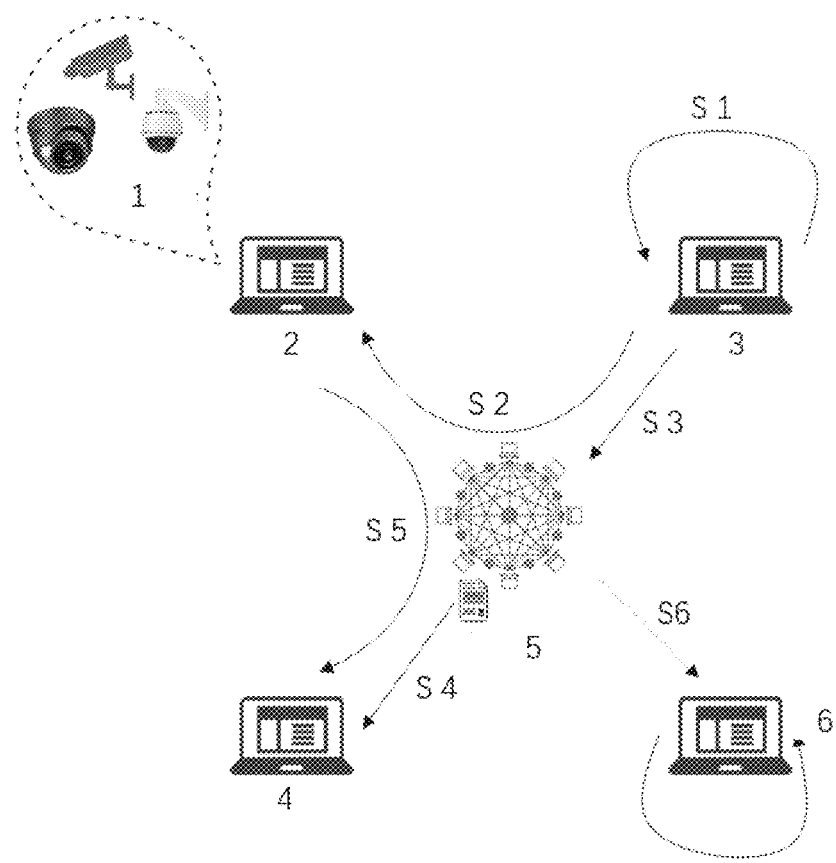

BLOCKCHAIN-BASED SYSTEM AND METHOD FOR PREVENTING UNAUTHORIZED DELETION OF SURVEILLANCE VIDEO

CROSS-REFERENCE

This application claims the benefit of priority to Chinese Patent Application No. CN202211742953.6 filed Dec. 30, 2022, all the contents of which are incorporated by reference into the DETAILED DESCRIPTION OF THE APPLICATION herein below.

BACKGROUND OF THE INVENTION

1. Technical Field

The present invention relates to public security, and more particularly to a blockchain-based system and method for preventing unauthorized deletion of surveillance video.

2. Description of Related Art

Public surveillance cameras include surveillance cameras installed along roads, in streets, at stations or so on and managed by regulatory bodies, and also include surveillance cameras installed in stores, hotels, schools and other public domains by the private sector. However, it is challenging for the authorities to store and real-time review the massive video data generated by these cameras every day. The real-world practice is that only after a public security incident happened, are the relevant video data retrieved by administrators in the regulatory bodies as evidences. In this case, if any of the administrators and/or the regulatory bodies is of interest with the incident under investigation, these video data, as potential evidence, are subject to risks of deletion, tampering, or destruction.

To provide better protection, the technical schemes based on the blockchain technology has been developed for data storage of surveillance video. For example, China Patent Publication No. CN111460526B discloses an "Image data recording, acquiring and verifying method and device based on blockchain." In the known image data recording method, the image pickup equipment monitors the image data output of an image sensor, and when the image data frame of the image data output by the image sensor is monitored, the output image data frame is subjected to Hash calculation to obtain a first Hash value of the image data frame, wherein the image data frame has image index information including timestamp information; and recording the first hash value of the image data frame and the image index information into the blockchain. However, the existing technical scheme has its disadvantages. First, "recording the image data frame, the first hash value of the image data frame and the image index information into the blockchain" as proposed in the known method will unavoidably cause continuous generation of image data frames, and this can lead to a huge storage burden. If every full node in the blockchain generates the same backup data, the overall data volume will soon be overwhelming. If we save only the frame index in the blockchain and leave video data at the video-recording node, the video data is at risk of malicious permanent deletion because the video-recording node has full authority to data in its custody. Second, in the known method, the index of the image frames contains information of camera devices, and this enables a malicious node added into the blockchain to access all data frames (i.e., complete video data) by synchronizing itself with the master node, leading to serious privacy concerns. Third, the index table in the known method is used to compare hush values of image frames and thereby verify the integrity of the video. Opposite to this, the present invention introduces an index table to determine address of storage nodes eligible to download a video file that is stored at non-local nodes.

Hence, there is an unmet technical challenge to protect video data from malicious deletion by directly using local storage capacity of individual video-recording nodes and/or without a redundant backup of video files.

In addition, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE APPLICATION

In the prior art, video files are usually stored at fixed storage addresses, and thus tend to be deleted maliciously.

In order to address such a concern, the present invention provides a blockchain-based system for preventing unauthorized deletion of surveillance video. The blockchain-based system at least comprises:
a plurality of camera components, for generating the surveillance video as individual video files; at least one video-recording node, for connecting to a blockchain network and randomly generating a key pair, splitting each of the video files received from the camera components into a plurality of video-file blocks and randomly sending the video-file blocks to participation nodes across the blockchain network for storage, and recording hash values and node information associated with the stored video files into a distributed hash table; and a blockchain network device, for updating the hash values of the video files uploaded by the video-recording nodes based on a smart contract associated with the blockchain network.

In the present invention, the file-uploading and -storing time of a video file is recorded by the smart contract in the blockchain as tamper-resistant time reference that is of great importance for law enforcement. The disclosed system and method effectively protect video data from malicious deletion at video-recording nodes without the need of introducing redundant storage space or updating hardware system. The deployment can be easily implemented using existing surveillance infrastructure, making the system highly versatile.

Preferably, the system further comprises user terminals, wherein a video-accessing terminal queries the hash values of a designated video file among the video files by invoking a query function of the smart contract responsible for recording from the blockchain network, and downloads the designated video file from the relevant video-recording node according to records in the distributed hash table.

Preferably, for intermediately storing the video file, the video-recording node calculates the hash values of the video file using a secure hash function, and uses a combination of the hash values as a digital fingerprint of the video file.

Preferably, splitting each of the video files into a plurality of video-file blocks by the video-recording node includes: splitting the video file into a plurality of video-file blocks according to a predetermined specification, and calculating the hash values of the video-file blocks and generate a file directory for recording the hash values.

Preferably, splitting each of the video files into a plurality of video-file blocks by the video-recording node also includes: uploading the video-file blocks to the blockchain network, calculating a distance between the video-file blocks and an address of each connected participation node, and sending the video-file blocks to the participation nodes having the shortest distances for storage.

Preferably, the video-recording node is further configured to: record stored information associated with each of the video-file blocks; update the distributed hash table; and invoke a record function associated with the smart contract from the blockchain network and record operational information of the video-recording node.

Preferably, the operational information of the video-recording node at least comprises: an address of the video-recording node, a file-uploading time, the hash values of the video file, and the number of the split video-file blocks.

The present invention further provides a blockchain-based method for preventing unauthorized deletion of surveillance video, comprising: connecting to a blockchain network and randomly generating a key pair, splitting the surveillance video received as a video file from a camera component into a plurality of video-file blocks, randomly sending the video-file blocks to participation nodes in the blockchain network for storage, and recording hash values and node information associated with the stored video file into a distributed hash table; and updating the hash values of the video file uploaded by the video-recording node according to a smart contract.

Preferably, the method further comprises: at a video-accessing terminal, querying the hash values of the designated video file by invoking a query function of the smart contract responsible for recording from the blockchain network, and downloading the video file from the video-recording node according to records in the distributed hash table.

Preferably, the method further comprises: splitting the video file into a plurality of video-file blocks according to a predetermined specification, and
calculating the hash values of the video-file blocks and generating a file directory for recording the hash values.

BRIEF DESCRIPTION OF THE DRAWINGS

FIG. 1 is a schematic diagram showing simplified architecture of a system for preventing unauthorized deletion of surveillance video according to a preferred mode of the present invention.

DETAILED DESCRIPTION OF THE APPLICATION

The following description, in conjunction with the accompanying drawings and preferred embodiments, is set forth as below to illustrate the present invention in detail.

Technical terms used throughout the specification shall have the meanings provided below.

Secure Hash Function

Secure hash function is a mapping of Hash function, and may be represented by h: $\{0, 1\}^* \rightarrow \{0, 1\}n$, where $\{0, 1\}^*$ is a bitstring set of an arbitrary length, and $\{0, 1\}n$ is a bitstring set of a length of n. The image h(x) of the message $x \in \{0, 1\}^*$ is referred to as the hash value of x.

Distributed Hash Table

Distributed hash tables represent a way to implement distributed storage. Therein, addressing and storage across a DHT network can be achieved without calling any server by having each client manage routing in a limited part of the entire network and store a small part of the entire data.

Conventionally, public surveillance cameras are managed by competent authorities. However, it is challenging for the authorities to store and real-time review the massive video data generated by these cameras every day. The real-world practice is that only after a public security incident happened, are the relevant video data retrieved by administrators in the regulatory bodies as evidences. In this case, if any of the administrators and/or the regulatory bodies is of interest with the incident under investigation, these video data, as potential evidence, are subject to risks of deletion, tampering, or destruction.

Hence, the inventor of the present invention herein provides a technical scheme that protects surveillance video recorded by public surveillance cameras from unauthorized deletion while still allowing local storage and convenient access to the surveillance video for evidence-taking purposes.

As shown in FIG. 1, the disclosed blockchain-based system for preventing unauthorized deletion of surveillance video at least comprises a plurality of camera components 1, a plurality of video-recording nodes 2, a video-uploading terminal 3, a video-accessing terminal 4, a blockchain including smart contract 5, and a video-deleting terminal 6. Each video-recording node 2 simultaneously communicates with multiple camera components 1 in a wired or wireless manner. In the present invention, the video-recording node 2, the video-uploading terminal 3, the video-accessing terminal 4, and the video-deleting terminal 6 in practical use may be realized as a single terminal device. Herein, descriptions about various terminals based on functions thereof are merely for better illustrating how the system of the present invention operates.

A blockchain network communicates with the video-recording nodes 2, the video-uploading terminal 3, the video-accessing terminal 4, and the video-deleting terminal 6 in a wired and/or wireless manner, for transmitting data such as message instructions or video files. The blockchain network comprises a plurality of servers as participation nodes. Each video-recording node 1 can also function as a participation node in the blockchain network.

A smart contract is in the form of a computer-executable program or a transaction protocol, and configured to, according to contracted or agreed provisions, automate actions, or to control or record events and actions. The purpose of a smart contract is to reduce dependency on trusted intermediaries, costs for arbitration, and lost caused by frauds, and to minimize malicious and unexpected exceptions. Smart contracts are typically related to cryptocurrency. Smart contracts introduced by Ethereum are usually regarded as basic building blocks for decentralized finance (DeFi) and NFT applications. In the present invention, the video-recording node 2 is an application-specific integrated circuit or a processor, or a server integrated with an application-specific integrated circuit and/or a processor, which is able to execute steps intended to be performed by a participation node as disclosed in the present invention.

Preferably, the video-recording nodes 2, the video-uploading terminal 3, the video-accessing terminal 4, and the video-deleting terminal 6 are collectively referred to as participation nodes, and each work as one of the participation nodes in a blockchain. The video-recording nodes 2, the video-uploading terminal 3, the video-accessing terminal 4, and the video-deleting terminal 6, each as a participation node, provide functions for storing data of video and images. To this end, the video-recording nodes 2, the video-uploading terminal 3, the video-accessing terminal 4, and the video-deleting terminal 6 are all equipped with memory with a capacity selected according to practical needs.

The video-uploading terminal 3, the video-accessing terminal 4, and the video-deleting terminal 6 may refer to one and only electronic device that provides versatile functions, or may refer to different electronic devices. As used herein, an electronic device may be, for example, a desk-top computer with a display, a portable electronic device, a tablet computer, a laptop computer, or the like. In particular, a portable electronic device, as used herein, may be for example a smartphone, a smart watch, smart glasses, or the like.

Preferably, the video-recording nodes 2, the video-uploading terminal 3, the video-accessing terminal 4, and the video-deleting terminal 6 can all be a server, in particular a server equipped with a display device.

Preferably, the camera components 1 are video cameras, such as monochrome video cameras, infrared video cameras, or the like.

In the present invention, the blockchain network devices interact with each other according to a smart contract. Preferably, data transmission and inter-node connection among the video-recording nodes 2 are implemented on the basis of the blockchain network and a smart contract associated therewith.

The disclosed blockchain-based system for preventing unauthorized deletion of surveillance video works by performing procedures described below.

S1: Preparation Stage, where the System is Initialized and Secret Keys are Generated.

Each video-recording node 2 is a participation node of the blockchain network. For its participation in the system, a secret-key pair (PK, SK) is randomly generated, where PK denotes a public key and SK denotes a private key.

At S11, every video-recording node 2 may be connected to multiple camera components 1, and it provides cache space of a certain size for video files it records, where the video files are pre-processed before stored.

At S12, the video-recording nodes 2 are connected through P2P network devices of the blockchain. During generation of the secret key pair, the video-recording node generates a random private key SK first, and then a public key PK is derived from the private key through calculation. Therein, the private key is obtained using a 256-bit binary string as the secp256k1 elliptic curve algorithm.

At S13, every video-recording node 2 has an address in the system that is the first 20 bytes of the product of h(PK), where h( ) is the secure hash function.

Therein, the generated private key SK is to be used in the system in occasions where identification is required, such as the identification to enable update of video-uploading records in the smart contract. The generated address is disclosed in the records as a representation of user identity. Each node is a participation node in the blockchain and naturally has its blockchain account. Herein, the private key SK is a private key associated with a given blockchain account.

In the prior art, private keys have not been in advance set on the uploading node. Without a private key in place, any anonymous node in the blockchain can alter the video-uploading records in the smart contract, and this undermines tamper-resistance and undeletability of video files stored in the system.

Differently, the present invention only allows sending- and receiving-parties to alter the video-uploading data recorded in the smart contract when the relevant private keys are in place. Without a private key, the smart contract is unable to identify a user and will never permit the user to make changes to any stored file. This effectively protects video files in the system from being deleted or tampered by any malicious node or interested party through the network, so as to ensure security and integrity of the recorded video files.

S2: Video-Storing Stage.

When recording video, a camera component 1 performs the Hash operation on the video file to get a digital video fingerprint. Then the video file is split into video-file blocks of the constant size. The size of the video-file block is determined by the system and every video-file block is numbered. The video-file blocks of the video file are randomly sent to nodes across the system network for storage, and the distributed hash table in the system is updated by recording the hash value and the node associated with the newly stored file. Meanwhile, the smart contract in the blockchain that records video-uploading history updates the hash value of the video file uploaded by some node at a given time point.

In the prior art, a video to be stored is split into video-file blocks with different sizes, and then allocated to several nodes in a certain order for distributed storage. One defect of doing so is that the ordered allocation of nodes makes the video-file blocks having data of the video easy to be found and deleted, being adverse to secure storage of video data. Moreover, inconsistence of the video-file blocks in size makes it almost impossible to quickly estimate the storage space at each receiving node according to merely the number of video-file blocks to be stored. If some node is about to use out its space, storage of video-file blocks allocated to this node is likely to be failed due to insufficient space, or the stored files will be corrupted. To solve these problems, the present invention implements an improved approach for block-based distributed storage.

The present invention provides two advantages by splitting a video file into video-file blocks of the same size.

First, since a video file is split and randomly distributed to different participation nodes, it is almost impossible that the video file could be tampered or deleted by evil of a single block-storing node or by collusion of the video-uploading node and one or more block-storing nodes. The random nature of data storage prevents data associated with any video content from being completely deleted at once, thereby improving data integrity of the video-file blocks.

Second, different video-recording nodes can generate video files differently in terms of time length and data size, and these differences can prevent effective use of the global storage capacity. In the present invention, a video file is split into video-file blocks of the same size, and the memory space required from a receiving node to accommodate the video-file blocks allocated to it can be easily calculated according to the total number of video-file blocks to be stored. This further helps match block allocations for subsequent video files with remaining spaces available in individual nodes so as to leave approximately equal margins in individual video-recording nodes. By doing so to prevent that some nodes have heavier loads than others, load imbalance among node across the system can be eliminated.

At S21, after a video is made, for intermediately storing the video file, the camera component 1 calculates a hash value of the video file using the secure hash function. The hash value is to be used as the digital fingerprint of the video.

At S22, the video-recording node 2 splits the video file into video-file blocks of the same size according to the system setting (such as 256 kb for each). The remaining part smaller than one block is stored as a separate video-file block. A video file initially smaller than one video-file block before being split is also stored as a separate video-file block.

In the present invention, a video file has to be split into video-file blocks of the same size. Consistence of video-file blocks in size makes it relatively easy to have a full picture of available spaces in individual nodes. The system is such designed that every node is allowed to upload video files onto the system in the same size as the space it provides for the system to store video files from other nodes. With video-file blocks of the same size, spaces required from individual nodes can be figured out through quick calculation according to the total number of video-file blocks as recorded in the smart contract. Additionally, sizing video-file blocks equally is favorable to implementation of file transfer protocols.

The video-recording node 2 calculates new hash values of the individual video-file blocks of the video file, and generates a file directory in which the hash values of all the video-file blocks forming the file are recorded.

To store video file, a video-recording node 2 uploads video-file blocks split from the video file onto P2P networks, calculates distances to all its connected nodes according to their addresses, and sends the video-file blocks to the nodes having the shortest distances from it for storage.

Preferably, the distance is determined using the following equation: distance=h(address) $\oplus$ h(file), where distance is the final calculated distance and used to determine which node is the one having the shortest distance; address is the hash value of the storage node address located in the blockchain; file represents data of video-file blocks; and h represents the Hash function.

The equation for calculation of distances provides a rule for randomly selecting nodes for storage. The random nature ensures that the calculation results are related to the hash values of the video-file blocks, and the hash values are not predictable.

Given that the file hash values are not predictable, the results of distance calculation not predictable, thereby realizing random selection of nodes. Since the selected nodes are relatively close to the node uploading video-file blocks, the transmission distance, the transmission time, and transmission delay for transmitting each of video-file blocks can be minimized. Also the risk of block damage during transmission can be reduced.

At S23, after uploading the video-file blocks, the video-recording node 2 updates the distributed hash table (DHT) by recording which video-file block is stored in which participation node.

The video-recording node 2 invokes the record function of the smart contract in the blockchain to record the operational information of the video file. The operational information at least includes an address of the video-recording node, a file-uploading time, the hash values of the video file, and the number of the split video-file blocks.

Preferably, by updating the distributed hash table, every video-file block has its storage information recorded, so that when a video-accessing terminal wants to check the video, it can restore the complete video from the video-file blocks.

Even if a node obtains the distributed hash table, it is not allowed to delete any video-file block without the relevant private key. As such, it is unlikely, or even impossible, to unauthorizedly delete any video-file block of any video file.

Optionally, for a file that needs to be backed up due to frequent use at local sites and/or higher importance, local backup may be stored in addition to being simply uploaded to the system. Since addressing and downloading video-file blocks of a file can be easily performed with relevant hash values, it is possible to provide protection, by, for example, encryption, to files containing personal data before uploading them.

In the regard of surveillance video, a video file may optionally be processed with face obfuscation before uploaded to the system to protect privacy of people appearing in the video. Alternatively, a video file may be encrypted as a whole. In this case, the secret key for encryption may be generated by the video-recording node itself or may be provided by a trusted third party, such as an administrator, depending on application scenarios.

As such, since video-file blocks of a video file can be uploaded without containing any privacy information, the risk of privacy disclosure can be totally eliminated even if they are downloaded by an authorized video-accessing terminal. In particular, the encryption key is generated by the uploading node or by a trusted third party, and not accessible to the video-accessing terminal, so privacy violation caused by key disclosure is prevented.

S3: Video-Accessing Stage.

To check a stored video file, a video-checking node invokes the query function of the smart contract responsible for recording in the blockchain to find the relevant hash values and look up relevant records from the distributed hash table, thereby being able to download the file from relevant nodes.

This prevents the video-accessing terminal from deleting any video-file block and limits its authority to nothing more than watching the video.

At S31, to watch a video file, the first step is to download the video file from the system. A video-accessing terminal 4 can achieve this by invoking the query function of the smart contract in the blockchain, and finding the hash value associated with the file based on the address of the uploading node, the file-uploading time, the file size, etc.

At S32, after the hash values are retrieved, the video-accessing terminal 4 finds the file directory of the entire video file according to the distributed hash table. From the file directory, the hash values of individual video-file blocks of the video file can be identified. Then the video-accessing terminal 4 uses the distributed hash table again to find addresses of the nodes storing the blocks corresponding to the hash values.

At S33, the video-accessing terminal 4 requests the downloading node to connect the identified storing nodes through P2P networks, and downloads video-file blocks by providing information of the video-file blocks to be downloaded.

The procedure described above is repeated until all the video-file blocks of the video file needed are retrieved. Then the video-file blocks are sorted and combined with reference to the file directory so as to restore the complete video file.

As such, the video-file blocks can be merged into the video fil at the video-accessing terminal. Since the video-file blocks are retrieved from multiple nodes, significant delay during transmission can be prevented. When the video-file blocks are merged at the video-accessing terminal to restore the video file, if some block is found damaged, this block can be easily download again without impacting transmission of the other video-file blocks. However, if video-file blocks are merged in the blockchain before transmitted to the video-accessing terminal, as performed conventionally, the damaged video file can adversely impact the overall transmission efficiency.

S4: Video-Deleting Stage.

The system is designed against manual deletion of files. To ensure that the system can store video data without providing redundant storage, for every participation node, the file size it is allowed to upload to the system is limited to the storage space it provides to the system for storing video files from its peer nodes. When the system capacity is about to be used up, old files are selectively replaced by new files according to predetermined rules. For example, as a basic rule, old files may be overwritten by new ones in a chronological order. Additionally or alternatively, important files may be assigned with higher priorities so as to be protected from being overwritten by files of lower priorities.

The disclosed system implements blockchain-based storage that principally inhibits manual deletion of video data, whether it is intentional or unintentional. As such, it effectively protects integrity of video files from subjective manipulation. When used for public security, the system of the present invention advantageously provides integral, securely-stored video files, thereby realizing objective storage and retrieval of video data.

At S41, a video-recording node can at any time figure out its available space by invoking the query function of the smart contract. For every video-recording node 2, its use of storage space of the system is calculated, and when the space is to be used up, options for expansion of the space and/or deletion of the stored files are provided. Also for every video-recording node 2, the file size it is allowed to upload to the system is limited to the storage space it provides to the system for storing video files from its peer nodes. When a node uploads a file, the smart contract in the blockchain records the address of the node and the number of video-file blocks x uploaded for the file, so as to calculate the space to be taken by the file from the node using the equation: $space_{add} = x_{add} \cdot 256$ kb.

At S42, deletion of files stored in the system is performed at a video-deleting terminal 6 according to predetermined rules, such as following a chronological order. Every video-recording node regularly checks the smart contract in the blockchain to confirm availability of left storage capacity at the nodes where it stores its files. The smart contract monitors available storage capacity by checking the sizes of the files uploaded by individual nodes. In the event that some video-recording node is about to reach a threshold of its use of space and that the file currently to be subject to the threshold-triggered deletion according to the rules is stored locally at the video-recording node, the node responds to a deletion instruction to delete the very file. Therein, the video-recording node is the node that uploaded the file, and the node that performs the foregoing deletion is the node where the file is stored. The deletion instruction is executed by the node where the file is stored according to the rules.

Moreover, the video-recording node that generated the file now to be deleted updates the distributed hash table and the contract records in the blockchain. The threshold for space use is custom, and may be, for example, 90%.

It is clear that associated video-file blocks of video files, once being stored in the disclosed system, can never be deleted by an instruction from any node in the system. Instead, the data will only be removed due to the exclusive, objective factor, namely the storage capacity of the system. Such a design ensures that uploading and storage of new files will always be performed in a real-time manner at nodes across the blockchain network without the risk of any failure caused by insufficient memory space, because the entire blockchain network consistently and autonomously performs an objective, rule-based data overwriting process. In particular, this provides benefits related to autonomous, dynamic storage of video data, and prevents human influence on data integrity across nodes in the blockchain network.

To prevent any video-uploading terminal 3 from uploading a huge amount of junk data to craftily supplant old video files, a daily upload limit is figured out and set for every video-uploading terminal 3. The daily upload limit is calculated and updated using historical upload statistics in order to prevent sharp changes in the limit, while allowing escalation of the quota in case of future addition of cameras, thereby endowing the system with flexibility. As such, nodes are protected from being entered into an abnormal state and can maintain their normal work. This also helps preclude unauthorized deletion of video data recorded during a certain time period in batch at nodes of different levels that malicious persons might attempt to conduct on the basis of file-uploading principles, thereby further protecting video files stored at nodes from technical intervention.

Preferably, the limit of the file size is calculated using the equation below:

$$\lim = \frac{\text{Sum of files greater than } \frac{\lim}{2} \text{ in past 30 days}}{\text{Number of days}}.$$

During initialization of the system, a relatively great value is assigned to lim. For example, assuming that a 100G capacity is provided by a node, if the need is to store video files associated with 30 days, it is desired that the value of lim is set as 6G. Other settings may be made according to different storage time lengths.

The disclosed system is designed against manual file deletion at any video-uploading terminal 3. To secure the system with the capability of storing video files from nodes across the network, for every video-uploading terminal 3, the file size allowed to upload to the system is limited to the storage space it provides to the system for storing video files from its peer nodes. Furthermore, requirements for capacity may be set for anyone hoping to join the system, such as a 64G capacity or more available for storing files from other video-uploading terminals.

It is to be noted that the particular embodiments described previously are exemplary. People skilled in the art, with inspiration from the disclosure of the present invention, would be able to devise various solutions, and all these solutions shall be regarded as a part of the disclosure of and protected by the present invention. Further, people skilled in the art would appreciate that the descriptions and accompanying drawings provided herein are illustrative and form no limitation to any of the appended claims. The scope of the present invention is defined by the appended claims and equivalents thereof. The disclosure provided herein contains various inventive concepts, such of those described in sections led by terms or phrases like "preferably," "according to one preferred mode," or "optionally." Each of the inventive concepts represents an independent conception and the applicant reserves the right to file one or more divisional applications therefor.

What is claimed is:

1. A blockchain-based system for preventing unauthorized deletion of surveillance video, at least comprising:
a plurality of camera components, for generating the surveillance video as individual video files;
at least one video-recording node, for connecting to a blockchain network and randomly generating a key pair, splitting each of the video files received from the camera components into a plurality of video-file blocks and randomly sending the video-file blocks to participation nodes across the blockchain network for storage, and recording hash values of the stored video files and node information into a distributed hash table; and
a blockchain network device, for updating the hash values of the video files uploaded by the video-recording nodes based on a smart contract associated with the blockchain network.

2. The blockchain-based system of claim 1, further comprising a video-accessing terminal, wherein
the video-accessing terminal queries the hash values of a designated video file among the video files by invoking a query function of the smart contract responsible for recording from the blockchain network, and downloads the designated video file from the relevant video-recording node according to records in the distributed hash table.

3. The blockchain-based system of claim 2, wherein for intermediately storing the video file, the video-recording node calculates the hash values of the video file using a secure hash function, and uses a combination of the hash values as a digital fingerprint of the video file.

4. The blockchain-based system of claim 3, wherein splitting each of the video files into a plurality of video-file blocks by the video-recording node includes:
splitting the video file into a plurality of video-file blocks according to a predetermined specification, and
calculating the hash values of the video-file blocks and generating a file directory for recording the hash values.

5. The blockchain-based system of claim 4, wherein splitting each of the video files into a plurality of video-file blocks by the video-recording node also includes:
uploading the video-file blocks to the blockchain network, calculating a distance between the video-file blocks and an address of each connected participation node, and sending the video-file blocks to the participation nodes having the shortest distances for storage.

6. The blockchain-based system of claim 5, wherein the video-recording node is further configured to:
record stored information associated with each of the video-file blocks;
update the distributed hash table; and
invoke a record function associated with the smart contract from the blockchain network and record operational information of the video-recording node.

7. The blockchain-based system of claim 6, wherein the operational information of the video-recording node at least comprises:
an address of the video-recording node, a file-uploading time, the hash values of the video file, and the number of the split video-file blocks.

8. The blockchain-based system of claim 7, wherein the video-recording nodes, the video-uploading terminal, the video-accessing terminal, and the video-deleting terminal are collectively referred to as participation nodes, and each work as one of the participation nodes in a blockchain.

9. The blockchain-based system of claim 8, wherein the video-recording nodes, the video-uploading terminal, the video-accessing terminal, and the video-deleting terminal, each as a participation node, provide functions for storing data of video and images.

10. The blockchain-based system of claim 9, wherein the video-recording nodes, the video-uploading terminal, the video-accessing terminal, and the video-deleting terminal are all equipped with memory with a capacity selected according to practical needs.

11. A blockchain-based method for preventing unauthorized deletion of surveillance video, comprising:
connecting to a blockchain network and randomly generating a key pair, splitting the surveillance video received as a video file from a camera component into a plurality of video-file blocks, randomly sending the video-file blocks to participation nodes in the blockchain network for storage, and recording hash values and node information associated with the stored video file into a distributed hash table; and
updating the hash values of the video file uploaded by the video-recording node according to a smart contract.

12. The blockchain-based method of claim 11, further comprising:
at a video-accessing terminal, querying the hash values of the designated video file by invoking a query function of the smart contract responsible for recording from the blockchain network, and downloading the video file from the video-recording node according to records in the distributed hash table.

13. The blockchain-based method of claim 12, further comprising:
splitting the video file into a plurality of video-file blocks according to a predetermined specification, and
calculating the hash values of the video-file blocks and generating a file directory for recording the hash values.

14. The blockchain-based method of claim 13, wherein the method further comprises:
for intermediately storing the video file, calculating the hash values of the video file using a secure hash function, and uses a combination of the hash values as a digital fingerprint of the video file.

15. The blockchain-based method of claim 14, wherein splitting each of the video files into a plurality of video-file blocks by the video-recording node also includes:
uploading the video-file blocks to the blockchain network, calculating a distance between the video-file blocks and an address of each connected participation node, and sending the video-file blocks to the participation nodes having the shortest distances for storage.

16. The blockchain-based method of claim 15, wherein the method further comprises:
recording stored information associated with each of the video-file blocks;
updating the distributed hash table; and
invoking a record function associated with the smart contract from the blockchain network and recording operational information of the video-recording node.

17. The blockchain-based method of claim 16, wherein the operational information of the video-recording node at least comprises:
an address of the video-recording node, a file-uploading time, the hash values of the video file, and the number of the split video-file blocks.

18. The blockchain-based method of claim 17, wherein the video-recording nodes, the video-uploading terminal, the video-accessing terminal, and the video-deleting terminal are collectively referred to as participation nodes, and each work as one of the participation nodes in a blockchain.

19. The blockchain-based method of claim 18, wherein the video-recording nodes, the video-uploading terminal, the video-accessing terminal, and the video-deleting terminal, each as a participation node, provide functions for storing data of video and images.

20. The blockchain-based method of claim 18, wherein the video-recording nodes, the video-uploading terminal, the video-accessing terminal, and the video-deleting terminal are all equipped with memory with a capacity selected according to practical needs.

* * * * *